Aug. 28, 1951  J. S. MACKAY  2,566,224
PRODUCTION OF MELAMINE
Filed Nov. 6, 1947
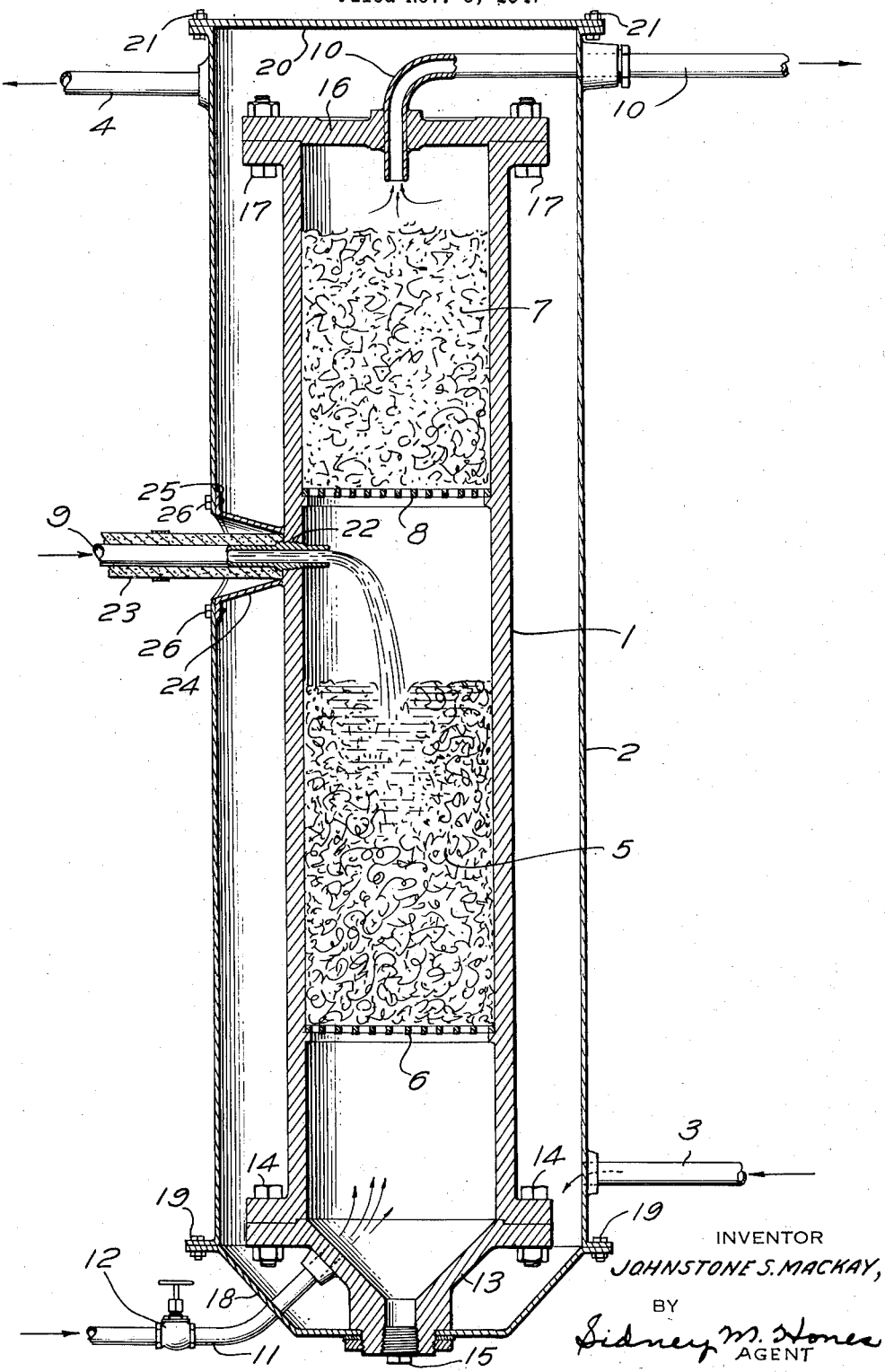
INVENTOR
JOHNSTONE S. MACKAY,
BY
Sidney M. Stones
AGENT Patented Aug. 28, 1951

2,566,224

UNITED STATES PATENT OFFICE 2,566,224

PRODUCTION OF MELAMINE

Johnstone S. Mackay, Old Greenwich, Conn., assignor to American Cyanamid Company, New York, N. Y., a corporation of Maine Application November 6, 1947, Serial No. 784,374

6 Claims. (Cl. 260—249.7)

The present invention relates to the preparation of melamine from urea and more particularly to an improved method whereby said conversion may be effected more efficiently.

In the production of melamine from urea, the urea is generally heated at temperatures within the range of 270°–500° C. in the presence of ammonia. Such heating results in the decomposition of the urea with the formation of melamine and such products as cyanuric acid, ammeline, ammelide, biuret, cyamelide, ammonium cyanurate, and various other non-volatile products, together with such volatile products as cyanic acid and perhaps other materials of unknown composition. Thus, the conversion of urea to melamine takes places via a series of obscure reactions with the formation of a large number of intermediates which must ultimately be converted to melamine in order for the process to be feasible. The conversion of these intermediate compounds to melamine is difficult, and while some success has been achieved in the past, it has been primarily by the use of extended periods of reaction. Obviously, the use of long periods of reaction is highly costly and otherwise disadvantageous. For example, the melamine first formed in the reaction mixture tends to decompose with the formation of insolubles, color-bodies, and other impurities. Some difficulty has also been experienced in the past in the conversion of urea to melamine by continuous processes. The main difficulty has been encountered in connection with the tendency of the melamine to set up to an impervious, tightly adherent, solid which tends to coat the side-walls of the container and results in eventually plugging the type of apparatus required for such continuous operation.

It is an object of the present invention to provide a process whereby urea may be converted to melamine rapidly and efficiently.

Another object of the present invention is to convert urea to melamine with a high degree of efficiency while minimizing the decomposition thereof with the attendant formation of undesirable contaminants.

A further object of the present invention is to provide a process whereby urea may be converted to melamine continuously while minimizing the difficulties due to the tendency of melamine to set up to an impervious, tightly adherent cake.

It has now been found that by carrying out the conversion of urea to melamine by passing the urea, and whatever thermal decomposition products thereof are formed, through a packed column maintained at a temperature of 270°–500° C., the melamine formation may be effected more rapidly with greater efficiency, and with less decomposition of the melamine while avoiding the difficulties due to the melamine setting up to an impervious, tightly adherent cake.

The process of the invention provides for more efficient contacting of the ammonia and the urea and decomposition products thereof which must be ammonated in order to result in the formation of melamine. This considerably reduces the time required to carry out the reaction and minimizes the amount of melamine decomposition with the result that not only are higher yields obtained, but also the melamine provided is contaminated with fewer impurities. Also, the use of a packed column is particularly adaptable to removal of the product in the vapor state by sweeping the reactor with ammonia. This not only reduces the tendency of the melamine to decompose, but also obviates the difficulties due to the melamine setting up to an impervious, tightly adherent cake on passing from the liquid to the solid state.

To provide an indication of the higher degree of purity of the melamine provided by the process of the present invention as compared with the product provided by other processes for converting urea to melamine, runs have been made putting the urea through a vertical tube and employing identical conditions except with regard to packing. In those experiments where no packing was employed in the tube, the melamine obtained was found to be only 86% pure, and to contain 8.6% of such water-insoluble materials as cyanuric acid, ammeline, and ammelide, and 2.6% of urea. The use of packing, on the other hand, provided a product which was 97% melamine, and contained only 2.6% of water-insolubles, and 0.3% of urea.

In converting urea to melamine, it is not necessary that added ammonia be employed, but rather it is only required that the urea be heated to the aforementioned temperature range of 270°–500° C. in a closed reactor. Under such conditions some of the urea decomposes to form a sufficient amount of ammonia for conversion of the remaining urea to melamine. That the presence of ammonia is required for melamine production is demonstrated by the fact that on heating urea in an open reactor, and thus permitting the ammonia formed by the urea decomposition to escape, no appreciable amount of melamine is formed. On the other hand, it is highly desirable that added ammonia be employed and, still further, that such amounts of added ammonia be employed as to provide a pressure of at least 200 lbs./sq. in., or still more preferably a pressure of at least 750 lbs./sq. in. If desired, pressures of the order of 1000 lbs./sq. in. and higher may be employed with advantage. The use of such high ammonia pressures not only serves to convert the urea more completely to melamine, but also to prevent the decomposition of melamine which readily occurs at such high temperatures. Such melamine decomposition is primarily due to its deammonation resulting in the formation of such materials as melem, melam, and melon. With ammonia pressures of the order of 1000 lbs./sq. in., there is not sufficient decomposition of melamine to warrant the use of appreciably higher ammonia pressures in view of the greater expense incurred in providing the heavier apparatus required to contain such pressures.

While the process of the invention may be carried out using a wide variety of apparatus designs, an example of apparatus suitable for carrying out the process is shown in the attached drawing. In said drawing there is shown packed column 1, which is jacketed by heating jacket 2, hot gases or other heating media being introduced at inlet 3 and removed through outlet 4 which communicate with the chamber formed between said packed column and jacket. Said column contains a lower packed section 5 held in place by support grid 6, and an upper packed section 7 which in turn is held in place by support grid 8. Said sections may be packed with any suitable packing such as glass beads, helices, wool, or rings, with porcelain Raschig rings, or saddles, and the like. If desired, different sized packing may be employed in the two packed sections, and, depending upon the dimensions of the column itself and such other variables as the temperatures and the pressure and the rate of flow of ammonia employed, optimum packing arrangements will be found to exist. It is also somewhat advantageous to vary the size and/or form of the packing through the depth of the individual packed sections. In the design shown in the drawing, molten urea is introduced at inlet 9 located between the aforementioned packed sections. Thus, the urea itself and the thermal decomposition products thereof such as those aforementioned are percolated through the lower packed section, while the volatile thermal decomposition products of the urea pass upwardly through the upper packed section and are removed through conduit 10 located at the top of the column. The ammonia is introduced at the bottom of said column through lower conduit 11, its rate of flow being controlled by valve 12. The cylindrical portion of the packed column is bottomed by conical section 13 and secured thereto by bolts 14, said conical section containing a drainage plug 15 at the apex thereof. Said cylindrical portion is topped by plate 16 which in turn is secured thereto by bolts 17. Similarly, the cylindrical portion of the aforementioned heating jacket is bottomed by frusto conical section 18 secured thereto by bolts 19 and topped by plate 20, secured thereto by bolts 21. The aforementioned urea inlet 9 is secured in the cylindrical portion of packed column 1 by means of threads 22, and lagging 23 is secured to said inlet by the usual means, the entire conduit and lagging assembly passing through the jacketed heating space by frusto conical section 24 which is shown as an integral part of the packed column and is secured to the inside of the jacket wall by means of its flange 25 and bolts 26. Thus, there is provided apparatus for carrying out the process of the invention which may be readily disassembled, as, for example, for cleaning, repacking, and the like, and reassembled.

In carrying out the process of the invention using the apparatus shown in the attached drawing and described above, urea, preferably in molten form, is introduced at inlet 9 into packed column 1 and allowed to percolate down through lower packed section 5, along with whatever thermal decomposition products thereof are formed. The entire column is maintained at a temperature within the range of 270°–500° C., preferably at a temperature within the range of 350°–400° C. Such temperatures are provided by heating the packed column by passing hot gases through the jacketed space formed between jacket 2 and the outer wall of column 1, said gases being introduced at inlet 3 and withdrawn at outlet 4. Ammonia is introduced at inlet 11 to flow upwardly through packed portion 5 and counter-currently with respect to the aforementioned percolating molten urea and the decomposition products thereof. On passing through said lower packed section, the ammonia enters upper packed section 7, passing concurrently with whatever volatile decomposition products of the urea are present, and is then removed through conduit 10 to be filtered or otherwise readied for recirculation.

While such operating conditions may be employed that the melamine formed will collect in lower conical section 13, from which it may be withdrawn by the removal of drainage plug 15, it is preferred to employ such conditions of temperature and ammonia pressure as will permit the removal of the melamine as vapor through the aforementioned conduit 10. Such conditions involve high temperatures and a sufficiently high rate of ammonia flow to provide a sweeping effect. The melamine is readily removed as a vapor at a temperature as low as 270° C., provided the aforementioned sweeping effect is obtained and a pressure not appreciably in excess of 200 lbs./sq. in. is provided. On the other hand, if a pressure as high as 750 or 1000 lbs./sq. in. is employed, a temperature of at least 350° C. is required to permit the melamine to be removed by sweeping the system with ammonia.

While the present invention is not to be construed as limited by any theoretical explanations, it is believed that upon introducing the urea into a reaction chamber maintained at the aforementioned 270°–500° C., the urea is quickly decomposed to form such materials as cyanuric acid, ammeline, ammelide, biuret, cyamelide, ammonium cyanurate, and perhaps various other non-volatile materials together with such volatile materials as, for example, cyanic acid. All of these materials are believed to be intermediates in the formation of melamine, being for the most part in varying stages of ammonation. These, therefore, require further contacting with ammonia and it is in this connection that the process of the present invention offers particular advantage. Experiments have shown that the use of a packed column provides very efficient contacting of such intermediates and the ammonia required for their ammonation, particularly when the ammonia is passed counter-currently with respect to the percolating urea and non-volatile intermediates. Thus, conversion to melamine is greatly accelerated by the use of packing. This is believed to be likewise true with the volatile decomposition products of the urea which pass through the packing concurrently with the ammonia, better contacting of the gases resulting from the turbulence which obtains as a result of the packing.

While the invention has been described with particular reference to a specific embodiment, it is not to be understood to be limited thereby, but rather to be interpreted broadly and construed solely with reference to the appended claims.

What is claimed is:

1. A method of producing melamine which comprises passing urea through a packed column maintained at 270°–500° C. in the presence of an ammonia pressure of at least 200 lbs./sq. in.

2. A method of producing melamine which comprises passing urea through a packed column maintained at 300°–400° C. in the presence of an ammonia pressure of at least 750 lbs./sq. in.

3. A method of producing melamine which comprises passing urea through a packed column maintained at 270°–500° C. in the presence of ammonia, sweeping ammonia through said packed column whereby melamine is formed and vaporized, and condensing and recovering said melamine.

4. A method of producing melamine which comprises passing urea through a packed column maintained at 300°–400° C. in the presence of an ammonia pressure of at least 750 lbs./sq. in., sweeping ammonia through said packed column whereby melamine is formed and vaporized, and condensing and recovering said melamine.

5. A method of producing melamine which comprises introducing urea into a reactor heated at 270°–500° C., percolating the urea and the non-volatile decomposition products thereof through a packed portion contained therein, passing any volatile decomposition products of said urea through another packed portion contained in said reactor while maintaining an ammonia pressure of at least 200 lbs./sq. in., and sweeping ammonia through said reactor whereby melamine is formed and vaporized, and condensing and recovering said melamine.

6. A method of producing melamine which comprises introducing urea into a reactor maintained at 350°–400° C., percolating the urea and the non-volatile decomposition products thereof downwardly through a packed portion contained therein, passing any volatile decomposition products of said area upwardly through another packed portion contained in said reactor while maintaining an ammonia pressure of at least 750 lbs./sq. in. and sweeping ammonia upwardly through said reactor whereby melamine is formed and vaporized, and condensing and recovering said melamine.

JOHNSTONE S. MACKAY.

REFERENCES CITED

The following references are of record in the file of this patent:

UNITED STATES PATENTS

| Number | Name | Date |
|---|---|---|
| 1,141,266 | Raschig | June 1, 1915 |
| 2,280,964 | Widmer | July 7, 1942 |

FOREIGN PATENTS

| Number | Country | Date |
|---|---|---|
| 502,148 | Great Britain | Mar. 9, 1939 |
| 583,504 | Great Britain | Dec. 19, 1946 |